Patented Feb. 20, 1940

2,190,825

UNITED STATES PATENT OFFICE 2,190,825

DYEING OF CELLULOSE DERIVATIVES

Paul Camille Elie Jacques Corbière, Lyon, France, assignor to E. I. du Pont de Nemours & Company, Wilmington, Del., a corporation of Delaware No Drawing. Application December 1, 1937, Serial No. 177,472. In Great Britain December 11, 1936

1 Claim. (Cl. 106—40)

The present invention relates to the production of colored materials comprising organic cellulose derivatives such as organic esters of cellulose or cellulose ethers.

It is an object of the present invention to uniformly color films, ribbons, caps, bands, threads, staple fibers, and other shaped products. Another object is to furnish a process of making such colored materials having a remarkable stability towards the action of light, hot aqueous solutions and chemical reagents. Still another object is to finely and uniformly disperse an azo dyestuff throughout a material consisting of an organic derivative of cellulose. Other objects will appear hereinafter.

These objects are accomplished in general by incorporating in a solution or plastic mass suitable for formation of films, ribbons, caps, bands, threads, staple fibers or other shaped objects a diazogene compound and a coupling component, and subsequently converting said diazogene compound and said coupling component, by a simple treatment, into an azo dyestuff.

By "simple treatment" is meant mere heating, or treatment with a simple chemical compound, such as an alkaline or acid bath, etc. In some cases the simple treatment consists in merely allowing the mixture to remain at room temperature until the ingredients react to form an azo dyestuff. Before this reaction proceeds to completion, the ingredients are thoroughly mixed with the cellulose derivative. By the term "diazogene" is meant a diazonium compound which reacts only slowly with a coupling component to form an azo dyestuff, or a compound which must be converted, by a simple treatment, into an aromatic dazonium compound before it will react with a coupling component to form an azo dyestuff. Among the diazogene compounds at present known may be mentioned the following classes:

1. *Diazoamino compounds.*—These are obtained by reaction between diazonium salts and some amino compounds that do not easily couple to form azo dyes. The reaction proceeds towards the formation of the diazoamino compound in the presence of a buffer such as sodium acetate. The diazoamino compounds are stable in alkaline solutions, but in acid solution the diazonium salt is regenerated. In this case, therefore, the "simple treatment" may be treated in acid.

2. *Stable diazonium salts.*—Certain diazonium salts are sufficiently stable to be dried, mixed with an inorganic salt and used in this form. Compounds of this type are described in U. S. Patent No. 1,846,150 to Schnitzspahn.

3. *Nitrosamines and anti-diazotates.*—These may be obtained by adding a solution of a diazonium salt to a solution of sodium hydroxide. The temperatures required for the conversion vary with the particular compound being used. The first step consists in the replacement of the acid group with a diazonium salt by a hydroxyl. This in turn reacts with further sodium hydroxide to form a salt called a diazotate. At low temperatures this is active and unstable, but at high temperatures it is transformed into an isomeric form that is inactive and stable, called an anti-diazotate. By adding one equivalent of an acid such as hydrochloric acid, the anti-diazotate is converted to a neutral solution of the nitrosamine. On treatment with another equivalent of acid, the nitrosamine is slowly changed to a diazonium salt.

4. *Diazonium salts or sulfonic acids.*—These may be obtained by treating a solution of a soluble diazonium salt with certain naphthalene or benzene sulfonic acids in the presence of certain metallic salts. Materials of this type and their method of preparation are disclosed in U. S. Patent No. 1,846,113 to Johner.

Preferably, the diazogene compound is derived from a "fast base", i. e., a base which is capable of yielding colors of great fastness when diazotized and coupled with naphthols.

Diazogene compounds are mixed with a coupling component and a cellulose derivative and are then ready for transformation into an azo dyestuff. Upon subjection to a simple treatment, the diazogene compound is transformed into a diazonium salt which then reacts with the coupling component to form the azo dyestuff. The coupling components are those well known and used in the formation of azo dyestuffs, for example, derivatives of naphthalene such as the anilide of 2-hydroxy-3-naphthoic acid, known commercially under the trade name "Naphthol AS", toluidides of 2-hydroxy-3-naphthoic acid, beta-naphthylamine; and similar derivatives of anthracene.

The introduction of the diazogene compound and of a coupling component into the material may be made at any convenient time before the materials acquire their final shaped form. The organic derivative of cellulose may, for example, be in the solid state, dissolved state, swollen state, or the peptized state. Introduction may be made in any desired fashion. Both coupling component and diazogene compound, for example, may be added directly to a spinning solution, either separately or together. Alternatively, either coupling component or diazogene compound or both can be separately dissolved and then all solutions including a spinning solution mixed together. It is preferred, however, to dissolve the coupling component, the diazogene compound, and the organic derivative of cellulose in a mutual solvent.

The simple treatment required to transform the ingredients into an azo dyestuff can be performed at any suitable stage or in any suitable manner before, during or after the colored articles have acquired their definite form. In the preferred form a solution containing a cellulose derivative, a diazogene compound and a coupling component is subjected to the simple treatment and the solvent evaporated. The colored material thus formed may then be dissolved in suitable amounts in a solution containing, if desired, additional amounts of cellulose derivatives, and the solution converted into colored articles such as films, threads, caps, bands, or other shaped articles having exceedingly good color stability towards the action of light, chemical reagents and the like. Alternatively, if desired, the solution containing cellulose derivative, coupling component and diazogene compound can be converted directly into a finished article, the simple treatment being applied before, during or after conversion.

The solvent utilized can be any one suitable for use in spinning cellulose derivatives, provided the diazogene compound and coupling component are stable in its presence. In some cases, for example, it has been found that the solvent used must be neutral or slightly alkaline in order to prevent the diazogene compound from decomposing to the corresponding diazonium compound in its presence. This depends, of course, upon the particular diazogene compound being used. Of organic solvents having a basic character, those that have been found suitable have been organic derivatives of nitrogen as, for example, pyridine or lower amines of the aliphatic series. These basic solvents may also be used in combination with neutral organic solvents. Alternatively, of course, when the diazogene compounds are stable in their presence, neutral solvents may be used.

The examples now given show various methods of carrying out the invention in practice, but are to be considered illustrative and not restrictive.

*Example I*

One gram of a mixture consisting of equimolecular quantities of the sodium salt of 3--diethyl sulfamide 5-ethoxybenzene-1-azosarcosine and para-chloro-ortho-toluidide of 2,3-hydroxynaphthoic acid is carefully made into a paste with 10 grams of diethylene glycol and 5 cc. of 33% aqueous ammonia solution. The homogeneous paste thus produced is diluted with about 20 cc. of acetone and added to a solution containing 1,000 grams of cellulose acetate and 3,000 grams of acetone. The resulting solution is well kneaded until the development of the azo dyestuff is produced spontaneously in a uniform and homogeneous dispersion throughout the mass. It is believed the following reaction occurs:

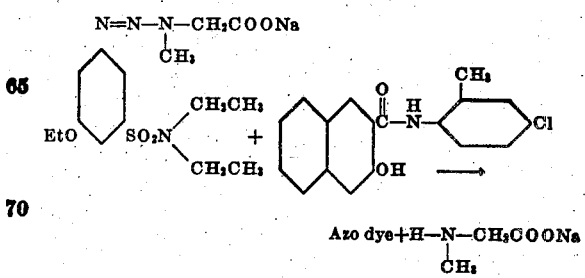

The solution thus secured is cast, moulded, or spun in the usual manner to obtain articles colored throughout their mass a bright rose shade and having a most remarkable fastness to light and to the action of soap.

*Example II*

Three hundred twenty grams of pyridine, 480 grams of 33% ammonia solution, and 200 grams of a mixture of equimolecular quantities of 4-benzoyl amino-2,5-diethoxybenzene-1-azo (piperidine-3-sodium sulfonate) and of ortho-toluidine of 2,3-hydroxyanthracene carboxylic acid, are dissolved together in the cold and filtered. An acetone soluble cellulose acetate material is impregnated and swollen with the thus prepared composition to such an extent that the diazogene and the coupling component penetrate into the material to a substantial degree. The impregnated cellulose acetate material is centrifuged, dried in air, and thereafter treated for 2 minutes at 90° C. in a bath containing 10 grams of acetic acid, 5 grams of sulfuric acid, and 20 grams of sodium sulfate per liter, after which it is rinsed and dried. Ten grams of the resulting colored cellulose acetate is dissolved with 990 grams of untreated cellulose acetate in acetone and the resulting solution is converted into threads, films, fibers and other structures colored throughout their mass a uniform green-blue shade of perfect fastness to boiling, even in an alkaline medium. It is believed the azo dye is formed by the following reaction:

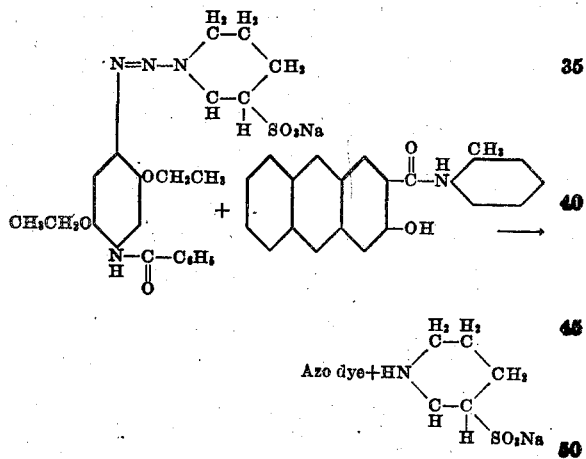

*Example III*

Two hundred fifty grams of pyridine, 20 grams of acetone soluble cellulose acetate, and 10 grams of a mixture comprising equimolecular quantities of (1) the product formed by the reaction of a solution of the diazo compound of 1-amino-4-benzoylamino-2,5-diethoxybenzene with sodium sulfanilate in the presence of sodium phthalate, and (2) the ortho-naphthalide of 2,3-hydroxynaphthoic acid are mixed until a homogeneous solution is obtained.

The so-prepared solution is precipitated at 90° C. with vigorous stirring in 5 liters of a bath containing 20 grams per liter of acetic acid to yield in a single operation a cellulose acetate deeply colored throughout its mass. By intimately mixing 5 grams of this colored cellulose acetate with 1,000 grams of uncolored cellulose acetate, it is possible to secure by the usual processes of milling, casting, spinning, and the like, threads, films, and other objects colored throughout their mass a blue-violet shade of perfect fastness to light and boiling even in an alkaline medium.

It is believed the azo dye is formed by the following reaction:

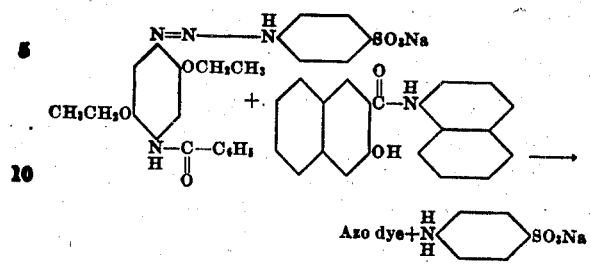

As organic derivatives of cellulose of which the invention may be applied, may be mentioned organic esters of cellulose such as cellulose acetate, cellulose propionate, cellulose acetopropionate, cellulose acetostearate, cellulose crotonate and organic ethers of cellulose such as methyl cellulose, ethyl cellulose and benzyl cellulose.

The process of the invention obviously offers a simple and expeditious method of dispersing a water insoluble azo dyestuff uniformly throughout a cellulose ester structure considerably superior to mechanical methods of prolonged and elaborate grinding and kneading in order to disperse uniformly the azo dyestuff into the cellulose ester structure. Spinning and other conversion operations may be performed more readily and continuously particularly so if the contained dyestuff forming components are not reacted together until the articles have been definitely shaped. The colored articles produced by the process of the invention exhibit considerable fastness to the action of light, chemical agents, and hot aqueous liquids. The process of the invention also possesses considerable flexibility in that the diazogene and coupling components may be introduced at any convenient stage before shaping the article but may be reacted together before, during, or after shaping the desired article.

Any variation or modification of the invention, as described above, which conforms to the spirit of the invention, is intended to be included within the scope of the claim.

I claim:

The process of dyeing organic derivatives of cellulose which comprises dissolving a cellulose derivative, a diazogene compound and a coupling component in a solvent therefor, converting said diazogene compound and said coupling component to an azo dyestuff to yield a colored cellulose derivative, drying said colored cellulose derivative, mixing said cellulose derivative containing the azo dyestuff with an additional quantity of untreated cellulose derivative to form a cellulose derivative thread spinning solution.

PAUL CAMILLE ELIE JACQUES CORBIÈRE.